(12) United States Patent
Jeon

(10) Patent No.: US 10,274,814 B2
(45) Date of Patent: Apr. 30, 2019

(54) ACCESSORY FOR PORTABLE ELECTRIC/ELECTRONIC DEVICE

(71) Applicant: Daehyung Jeon, Bucheon-si (KR)

(72) Inventor: Hyojin Jeon, Bucheon-si (KR)

(73) Assignee: Daehyung Jeon, Bucheon-si (KR)

( * ) Notice: Subject to any disclaimer, the term of this patent is extended or adjusted under 35 U.S.C. 154(b) by 3 days.

(21) Appl. No.: 15/512,627

(22) PCT Filed: Jul. 27, 2016

(86) PCT No.: PCT/KR2016/008220
§ 371 (c)(1),
(2) Date: Mar. 20, 2017

(87) PCT Pub. No.: WO2017/043765
PCT Pub. Date: Mar. 16, 2017

(65) Prior Publication Data
US 2017/0293207 A1 Oct. 12, 2017

(30) Foreign Application Priority Data
Sep. 7, 2015 (KR) .......... 10-2015-0126143

(51) Int. Cl.
*F16M 11/04* (2006.01)
*G03B 17/56* (2006.01)
(Continued)

(52) U.S. Cl.
CPC ......... *G03B 17/561* (2013.01); *F16M 11/041* (2013.01); *F16M 11/06* (2013.01);
(Continued)

(58) Field of Classification Search
CPC .............. F16M 11/041; F16M 11/06
(Continued)

(56) References Cited

U.S. PATENT DOCUMENTS 5,933,996 A * 8/1999 Chang .................... A47G 1/143
248/456
6,695,269 B1 * 2/2004 Anscher ................. A45C 13/30
224/269
(Continued)

FOREIGN PATENT DOCUMENTS

JP H03-112838 U 11/1991
KR 10-1267636 B1 5/2013
(Continued)

*Primary Examiner* — Clayton E. LaBalle
*Assistant Examiner* — Linda B Smith
(74) *Attorney, Agent, or Firm* — KORUS Patent, LLC; Seong Il Jeong

(57) ABSTRACT

Disclosed is an accessory for a portable electric/electronic device. The accessory includes: a base configured such that the back surface of a portable device is mounted on the back surface thereof, a passage channel having an entrance is formed through the center thereof, and a mounting depression is formed through the bottom surface thereof; a guider configured such that the guider is seated in the mounting depression, fastening recesses are oppositely and repeatedly formed on the left and right sides thereof, and the entry side thereof is open; a connection block including a polygonal swing plate configured to be seated in the fastening recesses, and a movable member configured to move along the passage channel and to have a connection hole; a grip formed configured such that the hinge shaft is fitted thereinto; and a cover configured to be mounted into the mounting depression of the base.

9 Claims, 7 Drawing Sheets

(51) Int. Cl.
*F16M 11/32* (2006.01)
*F16M 11/06* (2006.01)
*F16M 13/02* (2006.01)
*F16M 13/04* (2006.01)
*F16M 11/08* (2006.01)
*F16M 11/20* (2006.01)
*F16M 11/28* (2006.01)
*F16M 13/00* (2006.01)

(52) U.S. Cl.
CPC ......... *F16M 11/08* (2013.01); *F16M 11/2021* (2013.01); *F16M 11/28* (2013.01); *F16M 11/32* (2013.01); *F16M 13/00* (2013.01); *F16M 13/022* (2013.01); *F16M 13/04* (2013.01); *G03B 17/566* (2013.01); *F16M 2200/022* (2013.01)

(58) Field of Classification Search
USPC ......................................................... 396/428
See application file for complete search history.

(56) References Cited

U.S. PATENT DOCUMENTS

| | | | | |
|---|---|---|---|---|
| 7,301,759 | B2* | 11/2007 | Hsiung | H05K 5/0234 |
| | | | | 248/188 |
| 7,753,336 | B2* | 7/2010 | Hu | A47B 97/04 |
| | | | | 248/188.8 |
| 9,116,665 | B2* | 8/2015 | Su | G06F 1/1628 |
| 9,377,154 | B2* | 6/2016 | Hung | F16M 11/046 |
| 2007/0125923 | A1* | 6/2007 | Wong | F16M 13/02 |
| | | | | 248/315 |
| 2011/0031287 | A1* | 2/2011 | Le Gette | F16M 11/04 |
| | | | | 224/101 |
| 2013/0146625 | A1* | 6/2013 | Karle | A45F 5/00 |
| | | | | 224/217 |
| 2013/0279098 | A1* | 10/2013 | Cho | H05K 7/00 |
| | | | | 361/679.01 |
| 2016/0249718 | A1* | 9/2016 | Oh | H04B 1/3877 |
| | | | | 455/575.6 |
| 2017/0059968 | A1* | 3/2017 | Maltese | F16M 13/04 |

FOREIGN PATENT DOCUMENTS

| | | |
|---|---|---|
| KR | 10-2013-0085100 A | 7/2013 |
| KR | 10-1481256 B1 | 1/2015 |

* cited by examiner

ACCESSORY FOR PORTABLE ELECTRIC/ELECTRONIC DEVICE

TECHNICAL FIELD

The present invention relates to a portable accessory, and more particularly to an accessory for a portable electric/electronic device, which is used to carry or support a portable electric/electronic device (hereinafter referred to as a "portable device"), such as a mobile phone, a PMP, an MP3 player, an electronic dictionary, a tablet PC, or the like.

BACKGROUND ART

Recently, various types of accessories have been developed such that users can easily carry portable devices, such as mobile phones, PMPs, or the like. As an example, a strap-shaped accessory is provided on one side of a portable device, thereby enabling convenient carrying.

Generally, the portable device is held with the hand and then used. However, when a moving image is viewed for a long period of time or in some cases, the portable device may be supported on a bottom surface, such as the surface of a table or the like, and then used. Although the strap-shaped accessory enables the portable device to be conveniently carried, it is difficult to use it to support the portable device on a bottom surface, such as the surface of a table or the like.

For this reason, a problem arises in that a separate accessory (as an example, a support stand) must be used to support the portable device on a bottom surface, such as the surface of a table or the like.

Korean Patent Application No. 10-2013-0040554 discloses an accessory for a portable device.

DISCLOSURE

Technical Problem

An embodiment of the present invention is directed to an accessory for a portable electric/electronic device, which enables the structure of the accessory, to be mounted on a portable device, to be simplified, thereby improving the work efficiency of assembly and also reducing manufacturing costs via mass production.

An embodiment of the present invention is directed to an accessory for a portable electric/electronic device, which enables a portable device to be rotated to various angles by using the accessory, thereby allowing the portable device to be easily carried or viewed.

An embodiment of the present invention is directed to an accessory for a portable electric/electronic device, which enables the accessory to be mounted and used on a selfie stick or camera support tripod.

Technical Solution

In order to accomplish the above and other objects, according to an embodiment of the present invention, there is provided an accessory for a portable electric/electronic device, the accessory including:

a base configured such that the back surface of a portable device is mounted on the back surface thereof, a passage channel having an entrance formed at an entry to the passage channel is formed through the center thereof, and a mounting depression is formed through the bottom surface thereof;

a guider configured such that the guider is seated in the mounting depression, fastening recesses are oppositely and repeatedly formed on the left and right sides thereof, and the entry side thereof is open;

a connection block including: a polygonal swing plate configured to be seated in the fastening recesses in order to be rotated in a clockwise or counterclockwise direction; and a movable member configured to extend from the swing plate, to move along the passage channel, and to have a connection hole into which a hinge shaft is fitted;

a grip formed in a C shape, and configured such that the hinge shaft is fitted thereinto in order to fasten the grip onto the connection block; and a cover configured to be mounted into the mounting depression of the base in order to prevent the connection block from being separated from the base.

Advantageous Effects

The embodiment of the present invention, which is configured as described above, has the following advantages:

The accessory to be mounted on a portable device can be assembled in a one touch manner (which does not require a screw, a rivet, or the like) due to the simplification of the structure of the accessory, and thus labor costs can be reduced by decreasing assembly time and also manufacturing costs can be reduced via mass production by facilitating the manufacture of the accessory.

Furthermore, a portable device can be rotated to various angles by using the accessory and a rotated angle can be constantly maintained, and thus significant convenience is provided when a DMB program is viewed using a portable device, thereby providing practicality and convenience.

Moreover, the accessory can be mounted on a selfie stick or camera support tripod and used to easily adjust the angle of a portable device, thereby being used for various purposes.

MODE FOR INVENTION

Figure 1:
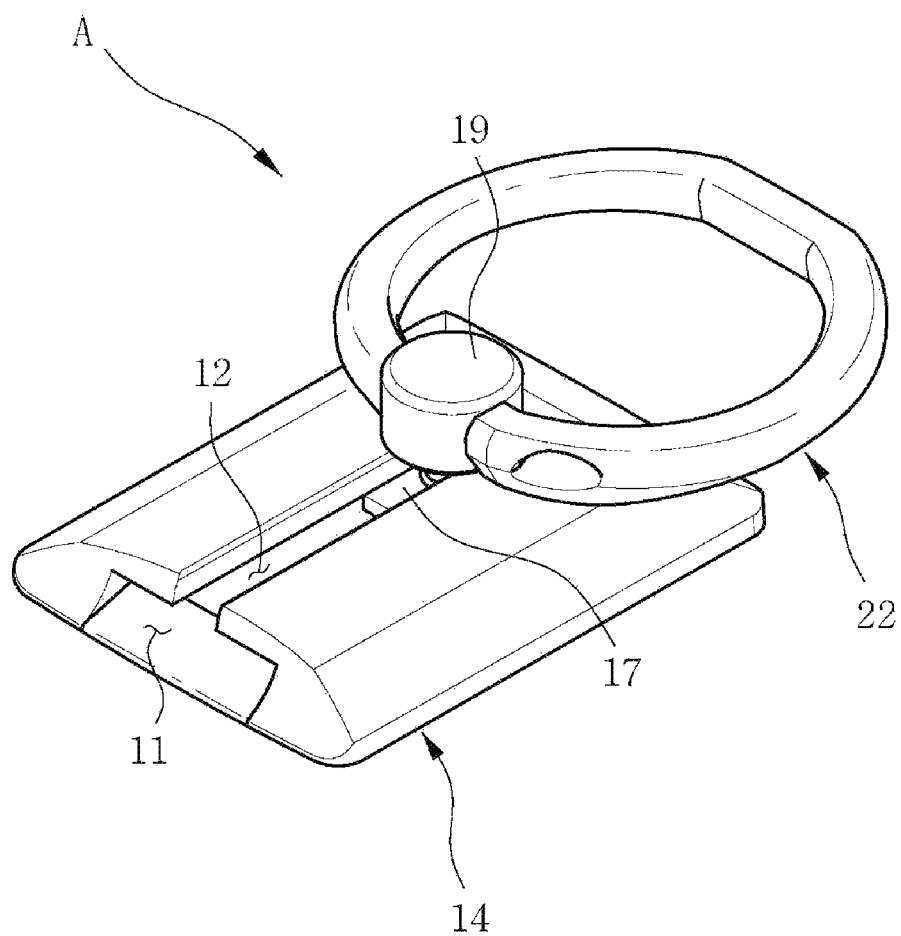
FIG. 1 is a perspective view of an accessory for a portable electric/electronic device according to an embodiment of the present invention.
Figure 2:
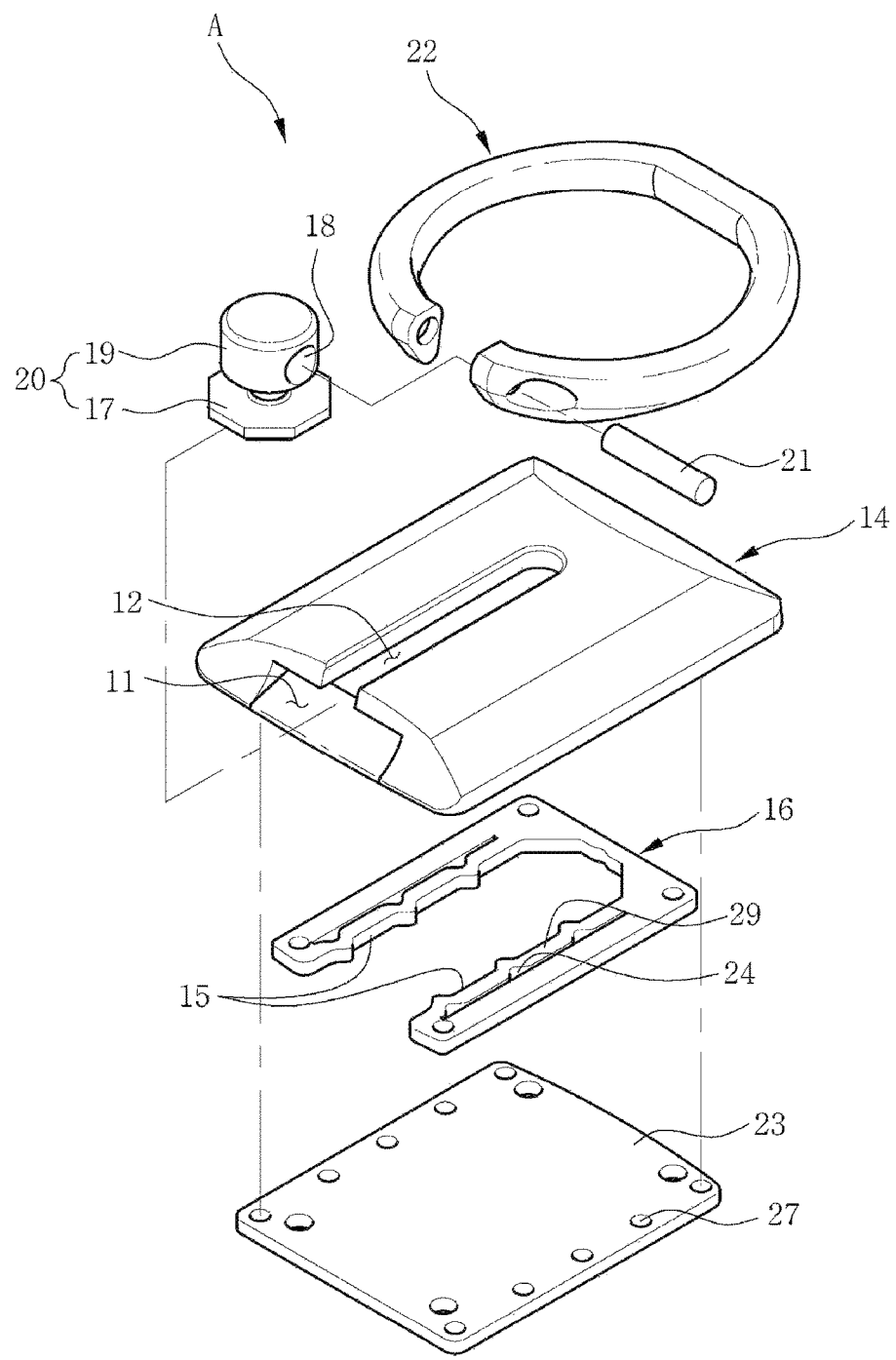
FIG. 2 is an exploded perspective view of the accessory shown in FIG. 1.
Figure 3:
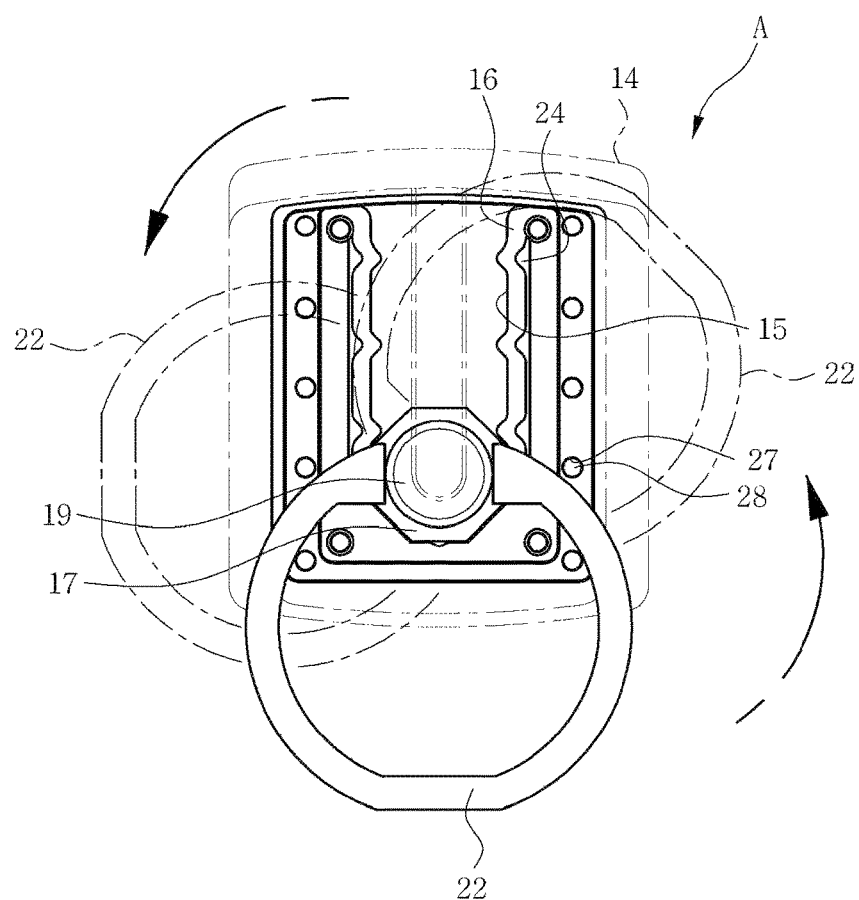
FIG. 3 is a plan view illustrating the swing operation of the accessory shown in FIG. 1.
Figure 4:
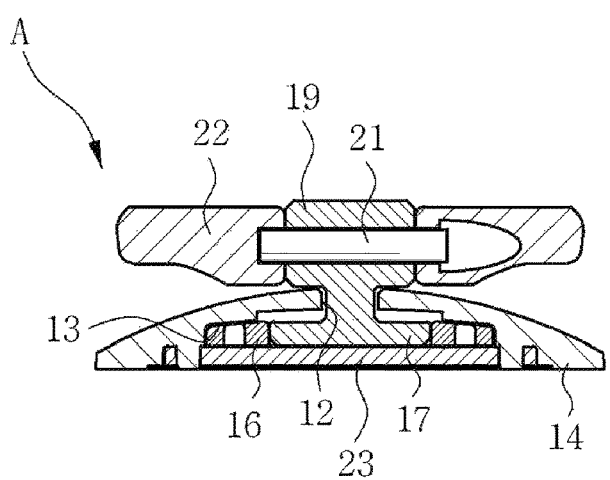
FIG. 4 is a sectional view of the accessory shown in FIG. 1.

An accessory for a portable electric/electronic device according to a preferred embodiment of the present invention will be described in detail with reference to the accompanying drawings below.

Referring to FIGS. 1 to 5(a) and 5(b), an accessory for a portable electric/electronic device according to an embodiment of the present invention includes:

a base 14 configured such that the back surface of a portable device 10 (which refers to a mobile phone, or the like) is mounted on the back surface thereof, a passage channel 12 having an entrance 11 formed at an entry to the passage channel 12 is formed through the center thereof, and a mounting depression 13 is formed through the bottom surface thereof;

a guider 16 configured such that the guider 16 is seated in the mounting depression 13, fastening recesses 15 are oppositely and repeatedly formed on the left and right sides thereof, and the entry side thereof is open;

a connection block 20: including a polygonal (for example, pentagonal, hexagonal, octagonal, or the like) swing plate 17 configured to be seated in the fastening recesses 15 in order to be rotated in a clockwise or counterclockwise direction; and a movable member 19 configured to extend from the swing plate 17, to move along the passage channel 12, and to have a connection hole 18 into which a hinge shaft 21 is fitted;

a grip 22 formed in a C shape, and configured such that the hinge shaft 21 is fitted thereinto in order to fasten the grip 12 onto the connection block 20; and a cover 23 configured to be mounted into the mounting depression 13 of the base 14 in order to prevent the connection block 20 from being separated from the base 14.

The guider 16 may be provided with slots 24 that are formed outside the fastening recesses 15 so that the fastening recesses 15 is elastically deformable when the swing plate 17 is rotated within the fastening recesses 15 in a clockwise or counterclockwise direction or moved along the passage channel 12.

The connection block 20 is detachably combined with the base 14 via the entrance 11.

The accessory may further include double-side tape (not shown) configured to be mounted on the back surface of the base 14 in order to detachably attach the portable device 10 onto the back surface of the base 14.

Figure 6:
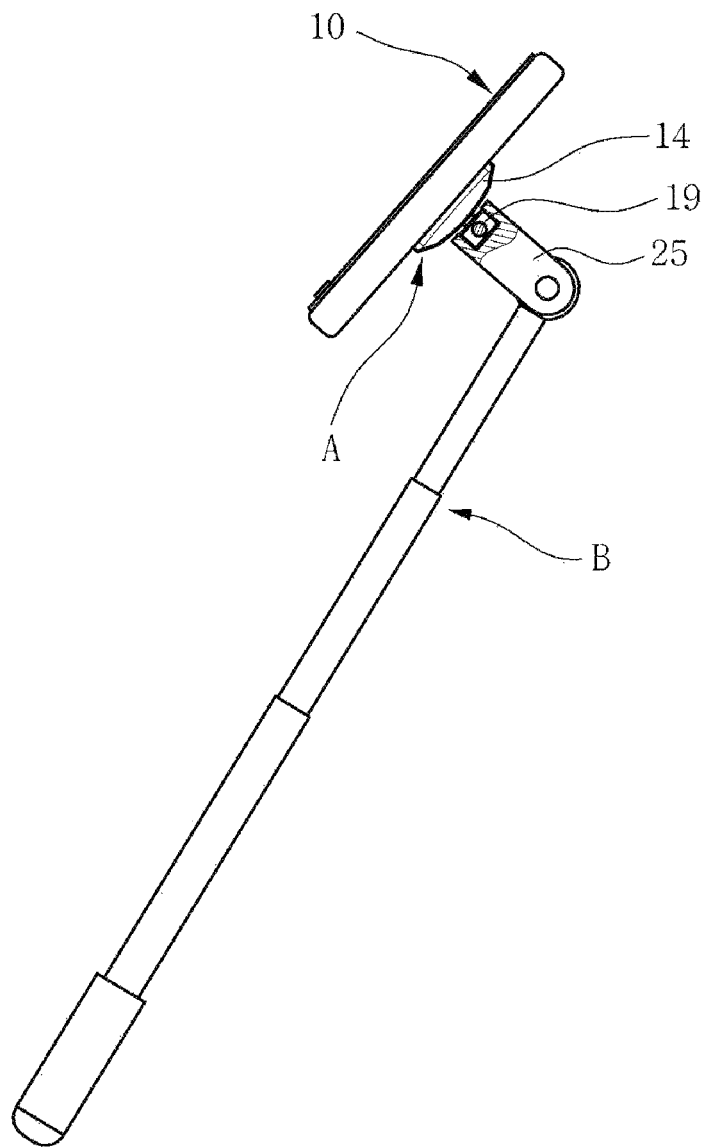
FIG. 6 is a diagram showing another state where the accessory for a portable electric/electronic device according to the embodiment of the present invention is used.

As shown in FIG. 6, the accessory may further include a selfie stick bracket 25 configured such that, in order to enable the accessory A to be mounted and used on a selfie stick B, one end thereof is fitted into the connection hole 18 of the movable member 19 of the connection block 20 and the other end thereof is rotatably fastened to the selfie stick B.

Figure 7:
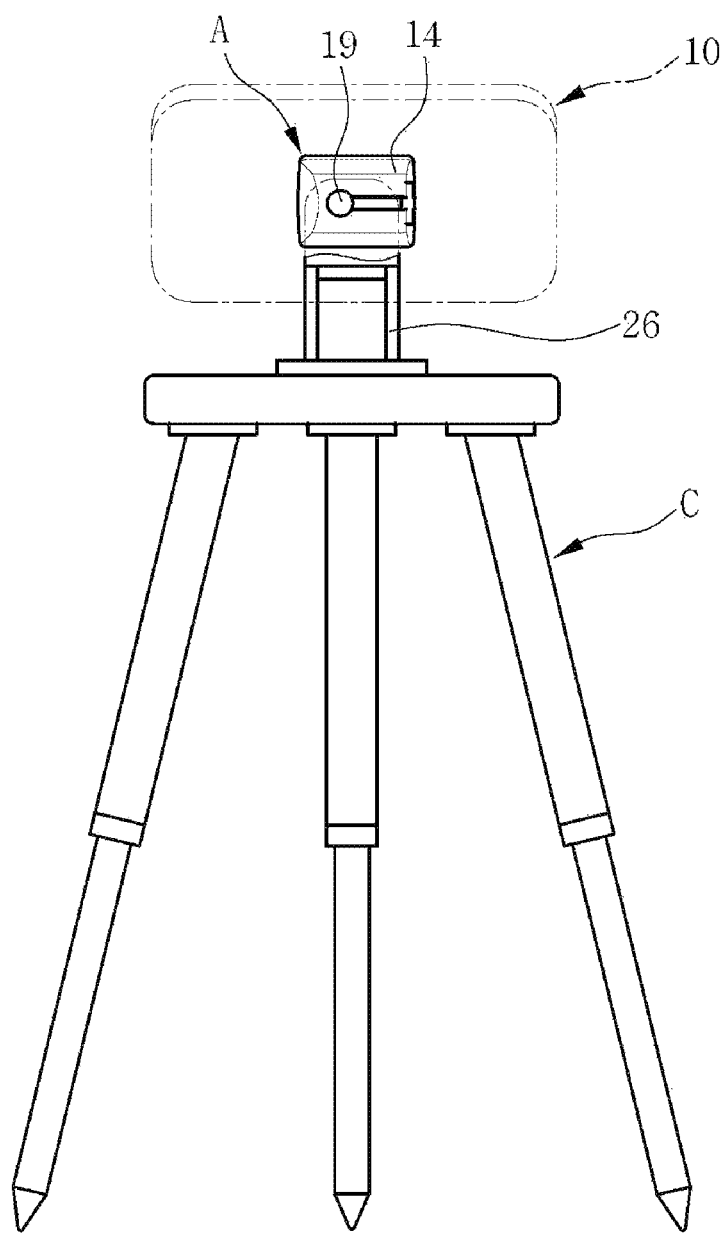
FIG. 7 is a diagram showing still another state where the accessory for a portable electric/electronic device according to the embodiment of the present invention is used.

As shown in FIG. 7, the accessory may further include a camera support bracket 26 configured such that, in order to enable the accessory A to be mounted and used on a camera support tripod C, one end thereof is fitted into the connection hole 18 of the movable member 19 of the connection block 20 and the other end thereof is angle-adjustably and rotatably fastened to the tripod C.

In the drawings, reference symbol 27 designates connection holes that are formed through the cover 23 in accordance with coupling pins 28 protruding in the mounting depression 13 of the base 13 in an integrated manner in order to enable the cover 23 to be mounted onto the base 14.

According to the above-described configuration, the guider 16 is seated in the mounting depression 13 formed through the bottom surface of the base 14.

The cover 23 is fastened onto the base 14 by fitting the connection holes 27, formed through the cover 23, over the coupling pins 28 formed on the mounting depression 13 accordingly.

Accordingly, the guider 16 can be prevented from being separated from the base 14.

After the swing plate 17 of the connection block 20 has been coupled via the entrance 11 formed at the entry to the passage channel 12 of the base 14, the connection block 20 may be slid along the passage channel 12.

In this case, the swing plate 17 formed in a polygonal shape (as an example, a octagonal shape in the drawings) is seated such that it can be rotated in a clockwise or counterclockwise direction within the fastening recess 15. Furthermore, when the cylindrical movable member 19 of the connection block 20 is moved along the passage channel 12, it may be seated in any one of the fastening recesses 15.

When the connection block 20 is slid along the passage channel 12 or the swing plate 17 is rotated within the fastening recesses 15 in a clockwise or counterclockwise direction as described above, ribs 29 forming the fastening recesses 15 are elastically deformed due to the slots 24 formed outside the fastening recesses 15, and thus the swing plate 17 can be moved or rotated.

In this case, the grip 22 may be folded within a range from 0 to 180 degrees via the hinge shaft 21.

The grip 22 may be fastened into the connection hole 18, formed in the movable member 19 of the connection block 20, by the hinge shaft 21 that is inserted into the connection hole of the grip 22.

Accordingly, after release paper has been separated from the double-side tape mounted on the back surface of the base 14, the back surface of the portable device 10 may be attached onto the double-side tape.

Figure 5A:
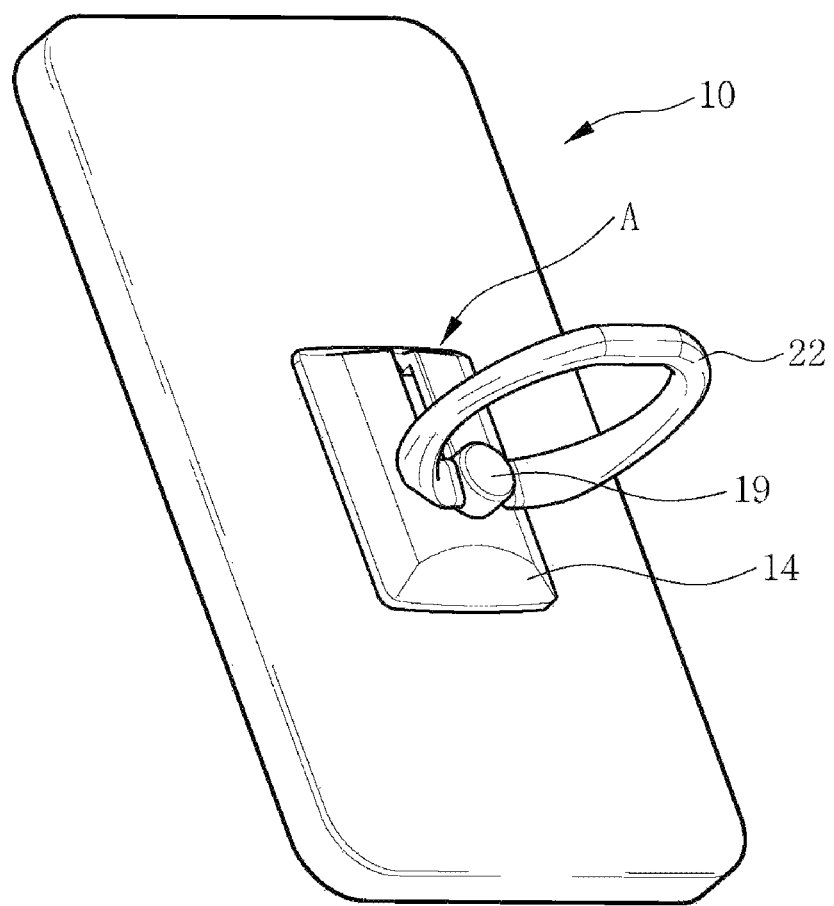
FIGS. 5(a) and 5(b) are diagrams showing a state where the accessory for a portable electric/electronic device according to the embodiment of the present invention is used.

As shown in FIG. 5(a), when the portable device 10 is carried in a subway train or vehicle or a DMB program or a moving image is viewed via the portable device 10, the portable device 10 may be safely and firmly held for a long period of time by using the ring-shaped grip 22.

In this case, as the grip 22 is rotated by the connection block 20 based on the base 14, the screen angle of the portable device 10 may be easily changed.

In greater detail, the swing plate 17 of the connection block 20 seated in the fastening recess 15 of the base 14 may be rotated in a clockwise or counterclockwise direction by the grip 22.

As described above, when the swing plate 17 is rotated within the fastening recesses 15, the ribs 29 forming the fastening recesses 15 are elastically deformed due to the slots 24 formed outside the fastening recesses 15. As a result, when the swing plate 17 is rotated, the fastening recesses 15 are enlarged to the outside, and thus the swing plate 17 may be easily rotated within the fastening recesses 14 in a predetermined direction.

When the swing plate 17 is rotated to a predetermined angle, the outer surface of the swing plate 17 is brought into tight contact with the inner surfaces of the fastening recesses 15 by the elastic restoring force of the ribs 29, and thus the swing plate 17 is not rotated within the fastening recesses 15.

As a result, a user may conveniently and easily adjust the screen angle of the portable device 10 to a desired angle.

Figure 5B:
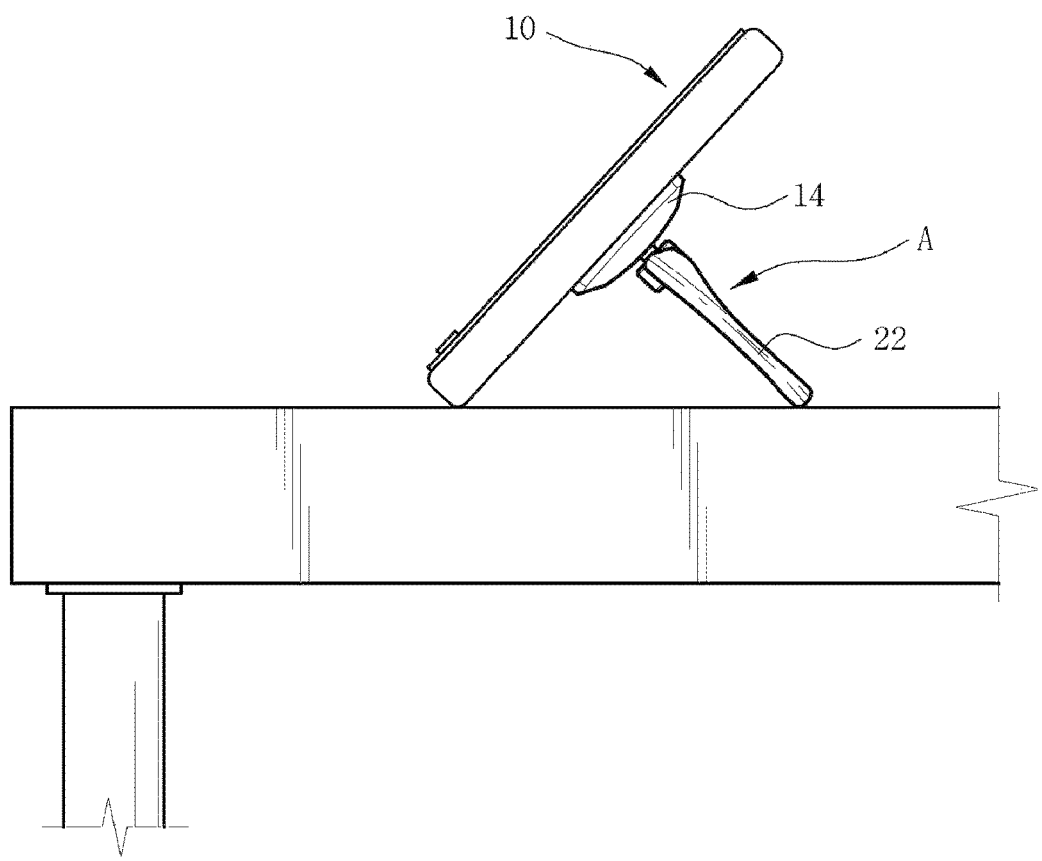

As shown in FIG. 5(b), when a DMB program or a moving image is viewed via the portable device 10, the portable device 10 may be slantingly supported on a support surface, such as the surface of a table or the like, at a predetermined angle by using the grip 22 as a support.

In greater detail, the grip 22 is rotated around the hinge shaft 21 fitted into the connection hole 18 of the connection block 20 mounted in the base 14, and one side of the grip 22 is seated on the top surface of the table so that the portable device 10 attached onto the base 14 is inclined at a predetermined angle with respect to the top surface of the table. In other words, a polygon formed in the grip 22 in a direction opposite to that of the hinge shaft 21 comes into tight contact with the top surface of the table, thereby preventing the grip 22 from sliding.

Accordingly, the portable device 10 may be maintained in the state of being inclined at a predetermined angle by using the grip 22.

Meanwhile, when the portable device 10 is carried in a pocket, the connection block 20 may be separated from the accessory A. In greater detail, as the movable member 19 of the connection block 20 is moved toward the entrance 11 along the passage channel 12, the connection block 20 to which the grip 22 has been coupled may be separated from the base 14 onto which the cover 23 has been mounted.

As a result, when the portable device 10 on the back surface of which the base 14 has been mounted is carried in a pocket, interference may be prevented from occurring due to the movable member 19 of the connection block 20 or the grip 22.

Although not shown in the drawings, when the grip 22 is fastened onto the movable member 19 of the connection block 20 by using the hinge shaft 21, a separate sleeve (not shown) may be fitted over the outside of the hinge shaft 21, and then may be fitted into the connection hole 18 of the movable member 19. This prevents the hinge shaft 21 from being worn when the grip 22 is repeatedly rotated, and also ensures the tight coupling between the connection hole 18 of the movable member 19 and the hinge shaft 21, thereby preventing the grip 22 from becoming loose.

While the present invention has been described with reference to the preferred embodiment, it will be appreciated by those skilled in the art that the present invention may be changed and modified in various forms without departing from the technical spirit and scope of the present invention that are described in the attached claims.

DESCRIPTION OF REFERENCE SYMBOLS

10: portable device
11: entrance
12: passage channel
13: mounting depression
14: base
15: fastening recess
16: guider
17: swing plate
18: connection hole
19: movable member
20: connection block
21: hinge shaft
22: grip
23: cover
24: slot
25: selfie stick bracket
26: camera support bracket
27: connection hole
28: coupling pin

The invention claimed is:

1. An accessory for a portable electric/electronic device, the accessory comprising:
a base configured such that a back surface of a portable device is mounted on a back surface thereof, a passage channel is formed through a center thereof in a longitudinal direction, one end of the passage channel being open, an entrance is formed at an entry to the passage channel, and a mounting depression is formed through a bottom surface thereof;
a guider formed in a U-shape, and configured such that the guider is seated in the mounting depression, fastening recesses are oppositely and repeatedly formed on left and right sides thereof, and an entry side thereof is open;
a connection block including: a polygonal swing plate configured to be seated in the fastening recesses in order to be rotated in a clockwise or counterclockwise direction around an axis perpendicular to the polygonal swing plate; and a movable member configured to extend from the swing plate, to move along the passage channel, and to have a connection hole into which a hinge shaft is fitted;
a grip formed in a C shape, and configured such that the hinge shaft is fitted thereinto in order to fasten the grip onto the connection block; and
a cover configured to be mounted into the mounting depression of the base in order to prevent the connection block from being separated from the base, the guider being positioned between the cover and the base,
wherein the guider is provided with slots that are formed outside the fastening recesses so that the fastening recesses is elastically deformable when the swing plate is rotated within the fastening recesses or moved along the passage channel.

2. The accessory of claim 1, further comprising a selfie stick bracket configured such that, in order to enable the accessory to be mounted and used on a selfie stick, one end thereof is fitted into the connection hole of the movable member of the connection block and a remaining end thereof is rotatably fastened to the selfie stick.

3. The accessory of claim 1, wherein the connection block is detachably coupled into the base via the entrance.

4. The accessory of claim 1, further comprising a camera support bracket configured such that, in order to enable the accessory to be mounted and used on a camera support tripod, one end thereof is fitted into the connection hole of the movable member of the connection block and a remaining end thereof is angle-adjustably and rotatably fastened to the tripod.

5. The accessory of claim 1, further comprising double-side tape configured to be mounted on the back surface of the base in order to detachably attach the portable device onto the back surface of the base.

6. The accessory of claim 1, further comprising double-side tape configured to be mounted on the back surface of the base in order to detachably attach the portable device onto the back surface of the base.

7. The accessory of claim 2, further comprising double-side tape configured to be mounted on the back surface of the base in order to detachably attach the portable device onto the back surface of the base.

8. The accessory of claim 3, further comprising double-side tape configured to be mounted on the back surface of the base in order to detachably attach the portable device onto the back surface of the base.

9. The accessory of claim 4, further comprising double-side tape configured to be mounted on the back surface of the base in order to detachably attach the portable device onto the back surface of the base.

* * * * *